(12) United States Patent
Byrne (10) Patent No.: US 6,229,787 B1
(45) Date of Patent: May 8, 2001

(54) MECHANISM TO ACHIEVE VERY FAST FAILOVER IN ATM BACKBONE NETWORKS USING MULTI-HOMED CIRCUITS

(75) Inventor: Donal M. Byrne, Saratoga, CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/758,189

(22) Filed: Nov. 25, 1996

Related U.S. Application Data
(60) Provisional application No. 60/025,910, filed on Sep. 11, 1996.

(51) Int. Cl.⁷ .................................................. H04L 1/22
(52) U.S. Cl. .......................... 370/218; 370/219; 370/225
(58) Field of Search .................................. 370/217–220, 370/225–228; 714/4

(56) References Cited

U.S. PATENT DOCUMENTS 5,440,538 * 8/1995 Olsen ...................................... 370/13
5,488,606 * 1/1996 Kakuma et al. ....................... 370/16
5,715,237 * 2/1998 Akiyoshi ............................. 370/228
5,854,899 * 12/1998 Callon et al. .................... 395/200.68

* cited by examiner

Primary Examiner—Melvin Marcelo
(74) Attorney, Agent, or Firm—Blakely, Sokoloff, Taylor & Zafman LLP (57) ABSTRACT

A first end-to-end connection between a source node and a destination node is established. The first end-to-end connection may include a number of point-to-point links between a number of intermediate nodes. At the same time, a second end-to-end connection is established between the source node and the destination node. The second end-to-end connection may also include a number of point-to-point links between a number of intermediate nodes, however, at least some of the point-to-point links and intermediate nodes which make up the second end-to-end connection are distinct from those which make up the first end-to-end connection. The source node stores connection information for both end-to-end connections. The source node establishes a session across the first end-to-end connection and, upon recognizing the failure of this connection, switches the session the second end-to-end connection automatically. In this way, the source node provides a very fast failover without the need to signal for a new virtual connection.

23 Claims, 5 Drawing Sheets

Fig. 1

| Input | | Output | |
|---|---|---|---|
| Port | VPI/VCI | Port | VPI/VCI |
| 1 | 36 | 2 | 21 |
| 2 | 21 | 1 | 36 |
| 1 | 43 | 3 | 36 |
| 3 | 36 | 1 | 43 |

MECHANISM TO ACHIEVE VERY FAST FAILOVER IN ATM BACKBONE NETWORKS USING MULTI-HOMED CIRCUITS

This application is related to and hereby claims the priority benefits of copending Provisional Application No. 60/025,910, filed Sep. 11, 1996, entitled Mechanism to Achieve Very Fast Failover in ATM Backbone Networks Using Multi-Homed Circuits, by Donal M. Byrne, pursuant to 35 U.S.C. §119(e).

FIELD OF THE INVENTION

This invention relates to the field of cell switching communications networks and, more particularly, to a method and apparatus to achieve rapid failovers in such a network.

BACKGROUND

Figure 1:
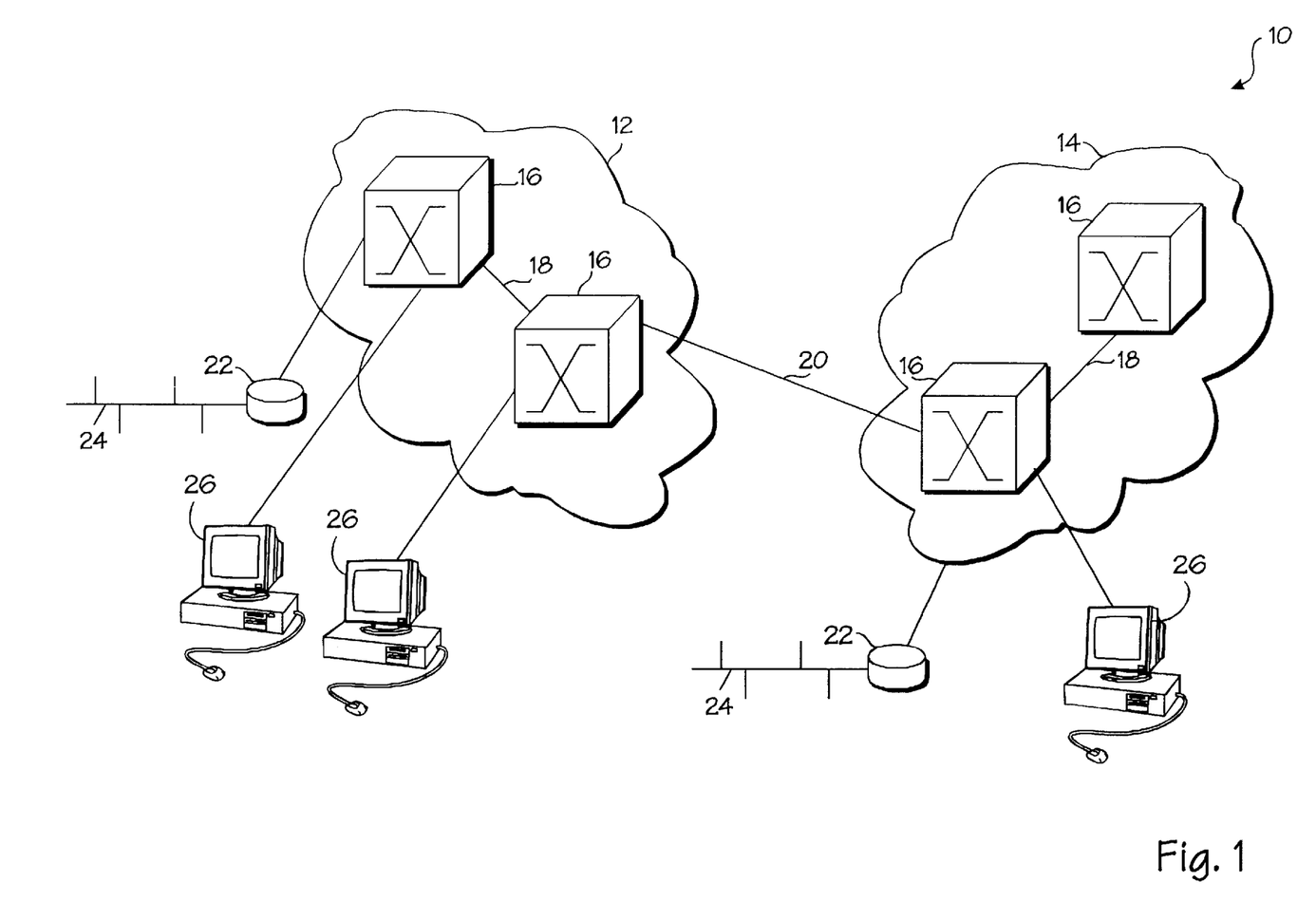
FIG. 1 illustrates an ATM network.

An ATM network consists of a set of ATM switches interconnected by point-to-point ATM links or interfaces. Exemplary ATM network 10, is shown in FIG. 1. ATM network 10 consist of a first ATM network 12 and a second ATM network 14. In some embodiments, both ATM networks 12 and 14 may be private ATM networks. In other embodiments, either of ATM networks 12 and 14 may be public or private ATM networks. Each ATM network 12 and 14 consists of a number of interconnected switches 16. Switches 16 are interconnected by point-to-point links 18. ATM network 12 is connected to ATM network 14 across user-to-network interface 20. A switch 16 may be connected to a variety of user stations, for example router 22 which supports local area network 24. Alternatively, an ATM switch 16 may be connected directly to a user terminal 26.

ATM networks such as network 10 are connection oriented. In other words, virtual circuits must be set-up across the ATM network prior to data transfer between users. ATM circuits are of two types: virtual paths, identified by virtual path identifiers (VPI); and virtual channels, identified by the combination of the VPI and a virtual channel identifier (VCI). A virtual path is a bundle of virtual channels, all of which are switched transparently across an ATM network on the basis of the common VPI. All VCI and VPI, however, have only local significance across a particular link, and are remapped, as appropriate, at each switch 16.

The basic operation of an ATM switch is rather simple: to receive a cell across a ink on a known VCI or VPI; to look up the connection value in a local translation table to determine the outgoing port or ports of the connection and the new VPI/VCI value of the connection on that link; and then to retransmit the cell on that outgoing link with the appropriate connection identifiers. The switch operation is so simple because external mechanisms set up the local translation tables prior to the transmittal of any data. The manner in which these tables are set up determine the two fundamental types of ATM connections.

The first type of ATM connection, permanent virtual connections (PVCs), are connections set up by some external mechanism, typically a network manager. When PVCs are configured, a set of switches between an ATM source and a destination ATM system are programmed with the appropriate VPI/VCI values. ATM signaling can facilitate the set up of PVCs, but, by definition, PVCs always require some manual configuration.

The second type of ATM connection, switched virtual connections (SVCs), are connections that are set up automatically through a signaling protocol. SVCs do not require the manual interaction needed to set up PVCs and, as such, may be more widely used in the future. All higher layer protocols operating over ATM primarily use SVCs.

ATM signaling is initiated by an ATM end-system that desires to set up a connection though an ATM network. Signaling packets are sent on pre-established virtual channels and the signaling is routed though the network from switch to switch, setting up the connection identifiers as it goes, until it reaches the destination end-system. The latter can either accept and confirm the connection request, or it reject it and clear the connection. The data will flow between the end-systems along the same path of the connection request.

Figure 2A:
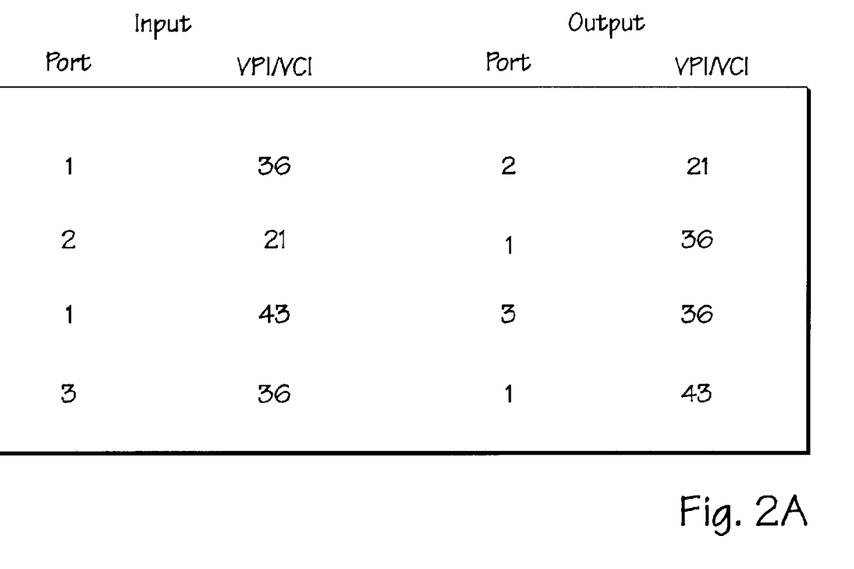
FIG. 2A illustrates a connection table maintained by a switch in an ATM network.
Figure 2B:
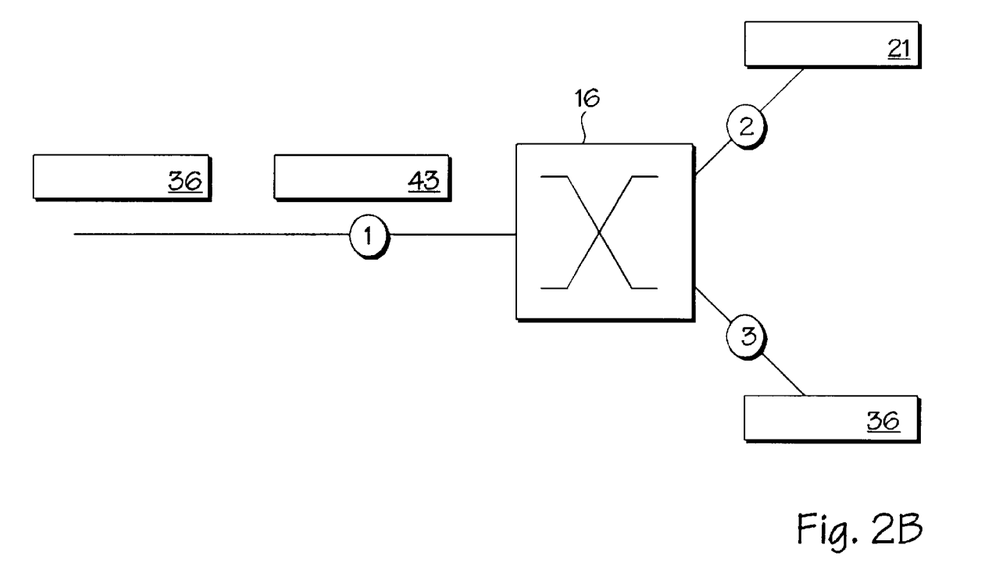
FIG. 2B illustrates the remapping function carried out by an ATM switch in an ATM network.

Regardless of whether the connection is established using PVCs or SVCs, each switch 16 will maintain a connection table to allow for remapping of VPI/VCI values. A sample connection table is shown in FIG. 2a with reference to the switch 16 shown in FIG. 2b. As indicated, cells with VPI/VCI values of 36 that are received at port 1 are mapped to port 2 on a VPI/FVCI of 12. Similarly, cells received at port 1 with a VPI/VCI of 34 are mapped to port 3 on a VPI/VCI of 63. FIG. 2b provides a graphical illustration of this remapping process. It will be appreciated that the VPI/VCI values shown in the figures are for purposes of illustration only.

As indicated, ATM is a connection oriented system. As such, connection requests need to be routed from a requesting node though the ATM network to a destination node. The ATM Forum is in the process of defining a private network-to-network interface (PNNI) protocol which will allow easier interconnection of ATM switches. The PNNI protocol consists of two components, the first is a signaling protocol used to relay ATM connection requests within a network between a source and a destination. The second is a virtual circuit routing protocol used to route signaling requests though the ATM network. This is also the route on which the ATM connection is set up and along which the data will flow. In an ideal scenario, every ATM switch in a network would not only know the address of every ATM attached installation but also the current available composite (VPI/VCI) for new SVCs to every switch. The more information a switch has about the network, the easier it is to build optimal routes to the destination. Of course, as ATM networks grow to include hundreds or even thousands of switches supporting tens of thousands of users and devices, this goal becomes unfeasible.

Nevertheless, finding the shortest or best available path from one point to another across the network does require that a given switch knows something about what the network looks like. The switch must know its own whereabouts in the network and be able to locate other switches or ATM installations so that it can establish virtual circuits offering the appropriate speed and quality of service parameters. The solution is a scheme that distributes and summarizes network topologies so that switches have detailed information about their local topology and summarized information about more distant regions of the network. The PNNI specification manages this information though the use of an hierarchical topology, along with an addressing scheme similar to that used in telephony networks.

Using PNNI, network nodes (i.e., switches) are provided with "reachability information" about other nodes. This reachability information is used by a source node to construct a designated transit list (DTL) that describes the complete route to the destination node. The DTL is inserted into the signaling request which is then transmitted along the path described by the DTL.

Figure 3:
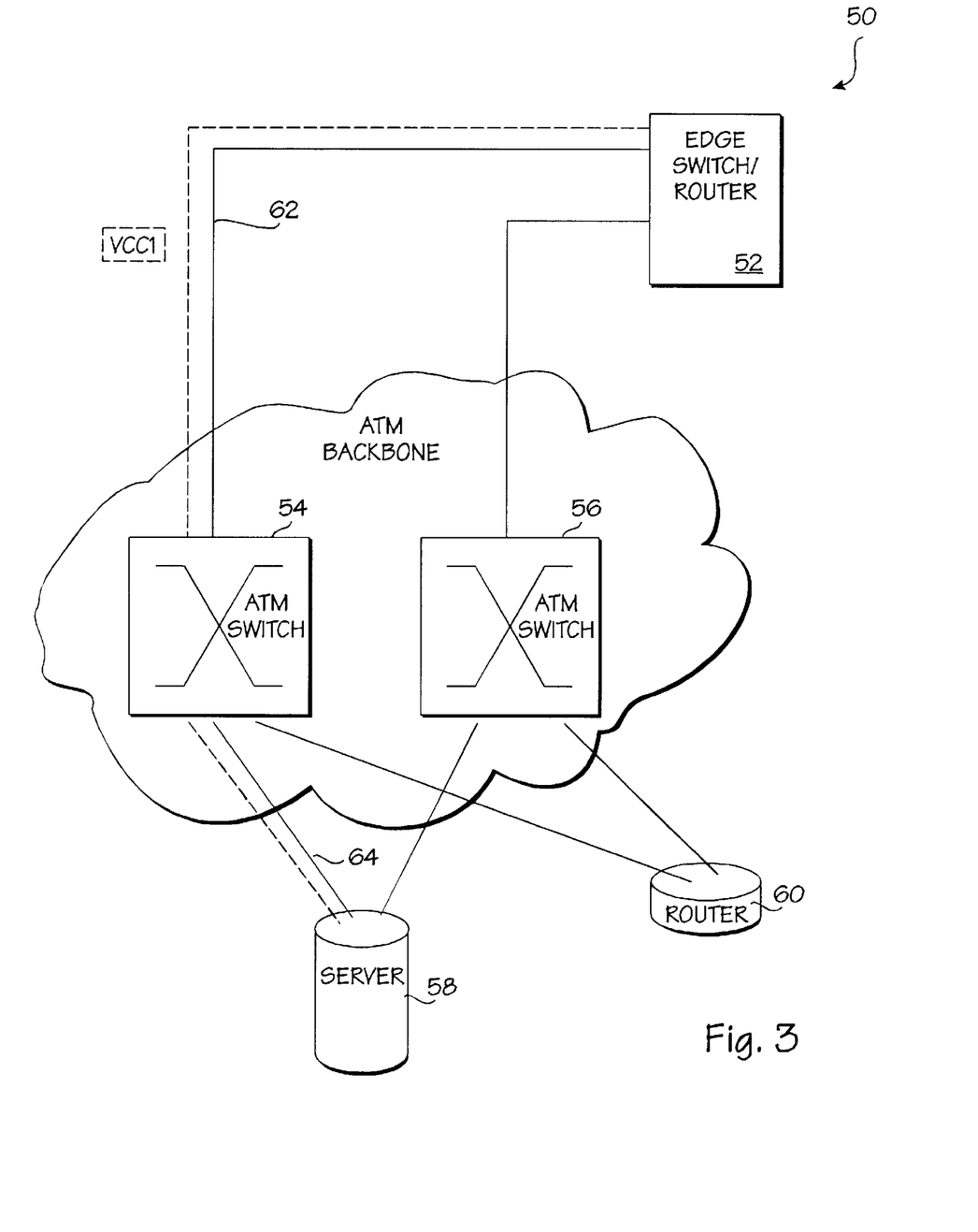
FIG. 3 illustrates a single virtual connection established between a source node and a destination node.

Typically, using PNNI, a single connection will be set up between a source node and a destination node. An example is shown in FIG. 3. Edge switch/router 52 has two physical connections to the ATM backbone. There are two ATM switches 54, 56 in the backbone and server 58 also has two physical connections to the backbone. Hence, edge switch/router 52 and server 58 are said to be dual homed. When a user (having an associated MAC or L3 address) wishes to connect from edge switch/router 52 to server 58 (also having an associated address), a connection, VCC1, is established, for example, across physical links 62 and 64 though switch 54. In the event of a link failure or a switch failure along the connection path, the source node (i.e., edge switch/router 52) must request another ATM destination address for the corresponding destination MAC address or L3 address associated with server 58. Once this information is provided, the source node must tear down the old connections and signal for a new connection. Given that there can be hundreds to thousands of connections per link and "n" times for this for a switch failure, the failover time (i.e., the time between the failure of one connection and the establishment of a new connection) can be many tens of seconds per link. The total failover time can be much longer than this when an address resolution phase is required. Most computer sessions time-out after such a lengthy outage. Accordingly, what is required is a mechanism which provides a very fast failover in the event of a link or switch failure.

SUMMARY OF THE INVENTION

According to one embodiment, a fast failover capability is provided in a data communications network which is made up of a number of nodes interconnected by a number of links. A first end-to-end connection between a source node and a destination node is established. The first end-to-end connection may include a number of point-to-point links between a number of intermediate nodes. At the same time, a second end-to-end connection is established between the source node and the destination node. The second end-to-end connection may also include a number of point-to-point links between a number of intermediate nodes, however, at least some of the point-to-point links and intermediate nodes which make up the second end-to-end connection are distinct from those which make up the first end-to-end connection. The source node establishes a session across the first end-to-end connection and, upon recognizing the failure of this connection, switches the session the second end-to-end connection automatically. By maintaining connection tables for both the first end-to-end connection and the second end-to-end connection, the source node can provide a very fast failover upon detecting the failure without the need to signal for a new virtual connection.

According to another embodiment, a data communications network includes a source node configured to store routing information regarding at least a portion of the network. The source node is connected to a backbone switching system by at least two independent links. Similarly, a destination node is connected to the backbone switching system by at least two independent links. A first end-to-end connection is established between the source node and the destination node across the backbone switching system. The first end-to-end connection may include a number of point-to-point links and a number of intermediate nodes. At the same time, a second end-to-end connection is established between the source node and the destination node and, the second end-to-end connection may also include a number of point-to-point links and a number of intermediate nodes. However, at least some of the point-to-point links in intermediate nodes which make up the first end-to-end connection are distinct from those which make the second end-to-end connection.

BRIEF DESCRIPTION OF THE DRAWINGS

The present invention is illustrated by way of example and not limitation in the figures of the accompanying drawings in which like numerals indicates similar elements and in which.

DETAILED DESCRIPTION

A mechanism which provides a very fast failover in the event of a link or switch failure in an ATM network is described. Although the present invention is described with reference to numerous specific details, upon review of the specification, those skilled in the art will appreciate that the invention can be practiced without some or all of this specific details. In addition to the disclosed embodiments, in alternative embodiments the present invention may be applicable to implementations of the invention in integrated circuits or chip sets, wireless implementations, switching systems products and transmission system products. As used herein, the terms switching systems products means private branch exchanges (PBXs), central office switching systems that interconnect subscribes, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 4:
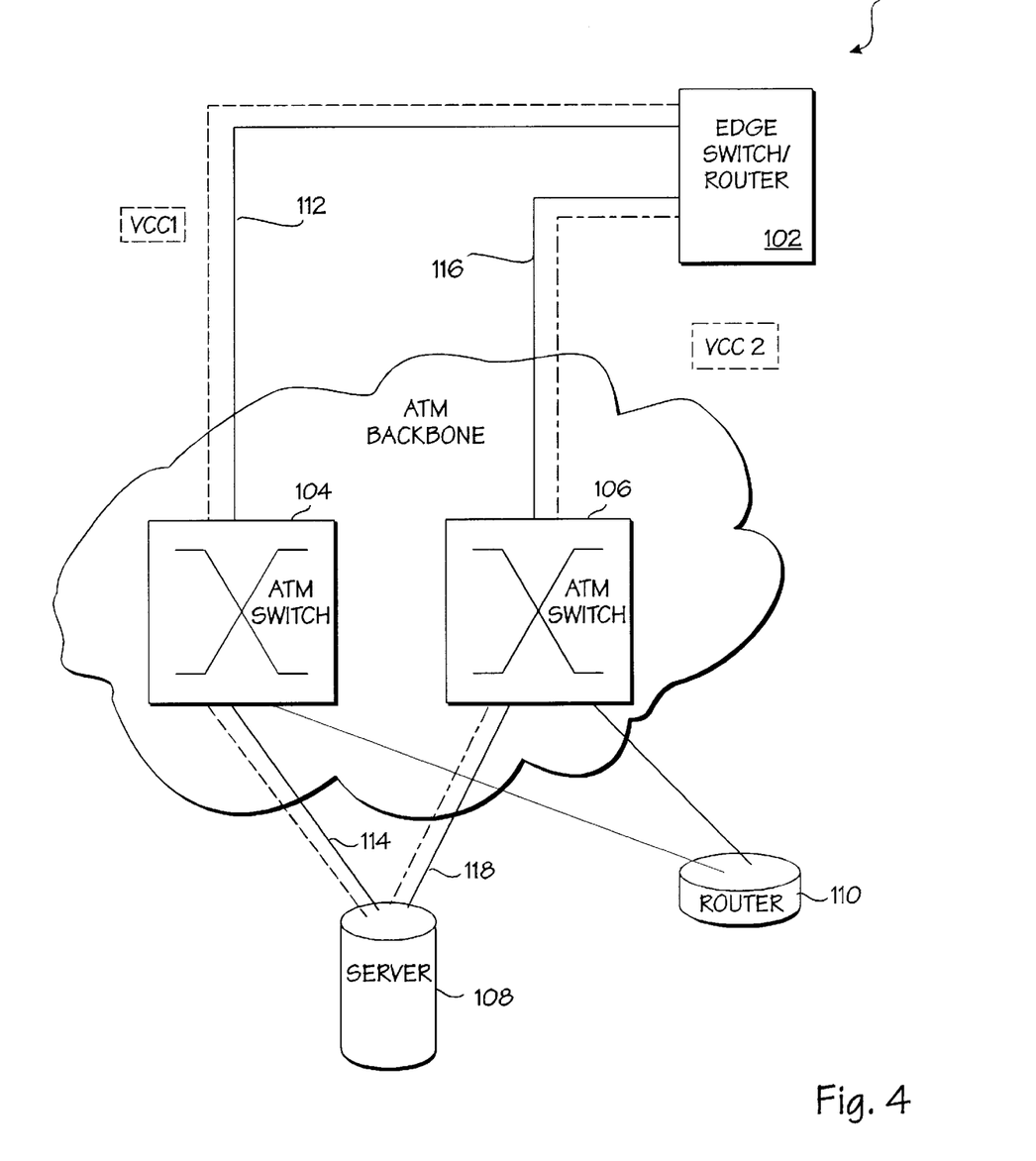
FIG. 4 illustrates an ATM network configured for fast failover in accordance with the present invention.

Referring now to FIG. 4, an ATM network 100 is illustrated. ATM network 100 includes edge switch/router 102 which has two physical connections, via links 112 and 116 to an ATM backbone. Two ATM switches 104 and 106 are illustrated within the ATM backbone. However, those skilled in the art will appreciate that the ATM backbone may consist of a number of switches interconnected by a number of point-to-point links. Server 108 is also connected to the ATM backbone, in particular ATM switches 104 and 106, by two physical links 114 and 118, respectfully. Hence, edge switch/router 102 and server 108 are dual homed. Similarly, router 110 has two physical connections to the ATM backbone and is also dual homed.

Edge switch/router 102 is configured to use the ATM routing protocol PNNI to advertise the reachability of a particular ATM address over multiple ATM physical links. The various levels of the switching hierarchy established by PNNI map different segments of the overall network 100 in different degrees of detail. By breaking a large network of ATM switches, such as network 100, into smaller domains called peer groups, PNNI allows individual switches to navigate paths though the network 100 without requiring them to store an entire map of the network 100 in memory. PNNI organizes similar switches into peer groups and the leaders of like peer groups into higher peer groups, each of which contains one switch that is designated as a leader. The leader switch also becomes the peer of other peer group leaders at its level in the network 100. The peer group leader summarizes information about the devices that can be reached in its peer group and acts as the peer group's conduit for information about the peer groups above it.

Using PNNI, switches in an ATM network automatically form a hierarchy of peer groups according to addresses assigned by the network manager. The switches' ATM addresses provide the key to the structure of this hierarchy. Each peer group has its own address identifier, similar to a telephone exchange or area code. For a lower level peer group this address is similar to an area code and exchange. For a higher peer group, it would be similar to just the area code. Finally, each switch within a peer group has a unique address, similar to the way each line in a telephone exchange has a unique number.

Once the PNNI hierarchy is created, peer group leaders are allocated, and routing information is exchanged, the ATM switches can begin to establish SVCs between various end-stations on the network. Using the PNNI protocol, installations on remote networks can easily establish SVCs across the hierarchy with other end stations and different peer groups.

When a signaling request is received across a user-to-network interface by a ingress switch (e.g., edge switch/router 102), the switch will use a shortest path algorithm, such as a Dijkstra calculation, to determine a path to connect the source node to the desired destination. This calculation will create a set of DTLs, and each switch will have: a full, detailed path within the source node's own peer group; a less detailed path within the parent peer groups; and even less detail on higher level peer groups, terminating in the lowest level peer group which is an ancestor of both the source and the destination nodes. Hence, using PNNI, SVCs can be set up across a network. Once the connection is established, ATM cells are forwarded by simple table lookups, using connection tables such as those described above. PNNI searches to set up the tables in each switch along the path so that this can happen.

Accordingly, when upper layer protocols (e.g., LANE or RFC 1577) return a binding between the user's L2/L3 address and the ATM address of server 108, edge switch/router 102 requests two independently routed connections to be set up to the destination ATM address. This is different from the prior art where only a single connection will be set up.

In other words, when a user connected to edge switch/router 102 seeks to establish a session with server 108, edge switch/router 102 will use PNNI to establish multi-homed circuits, VCC1 and VCC2, across two distinct paths. As shown in FIG. 4, VCC1 is established across links 112 and 114 through switch 104. Circuit VCC2 is established across links 116 and 118 through switch 106. The information required to set up the two derived paths was obtained from PNNI which is running locally in edge switch/router 102. Any session between a source L2/L3 address (i.e., a user connected to edge switch/router 102) and a destination L2/L3 address (e.g., server 108) is carried out only over one of the connections to prevent packet out-of-order delivery. A session balancing scheme can be used to achieve equal distribution of multiple sessions across the two paths. That is, in the case where multiple sessions are to occur between edge switch/router 102 and server 108, a load balancing algorithm running in edge switch/router 102 can utilize either VCC1 or VCC2 as appropriate for each session in order to achieve an equal distribution of sessions across the two connection paths.

When a link or switch failure occurs within ATM network 100, the failure is detected by a PNNI update. This notifies the forwarding process that one of the paths has failed. Because the forwarding table maintained by edge switch/router 102 now has multi-path entries in it, i.e., the path entries for the links and intermediate nodes comprising VCC1 and VCC2, the path for the failed link can be marked as invalid. If a current path or session is marked as invalid, then a forwarding process running on edge switch/router 102 chooses the alternate path for forwarding the remainder of the session. There is no need to go though an address resolution phase because the binding between the user's L2/L3 address and the ATM address of server 108 is still valid and there is no need to resignal for a new connection. Hence, the time taken to achieve the failover from the failed link to the new link depends only on the time it takes to notify the edge switch/router 102 that the particular path is bad. Typically, this can be less then one second. The tear down of the failed circuit can still be done over a reasonable time.

Figure 5:
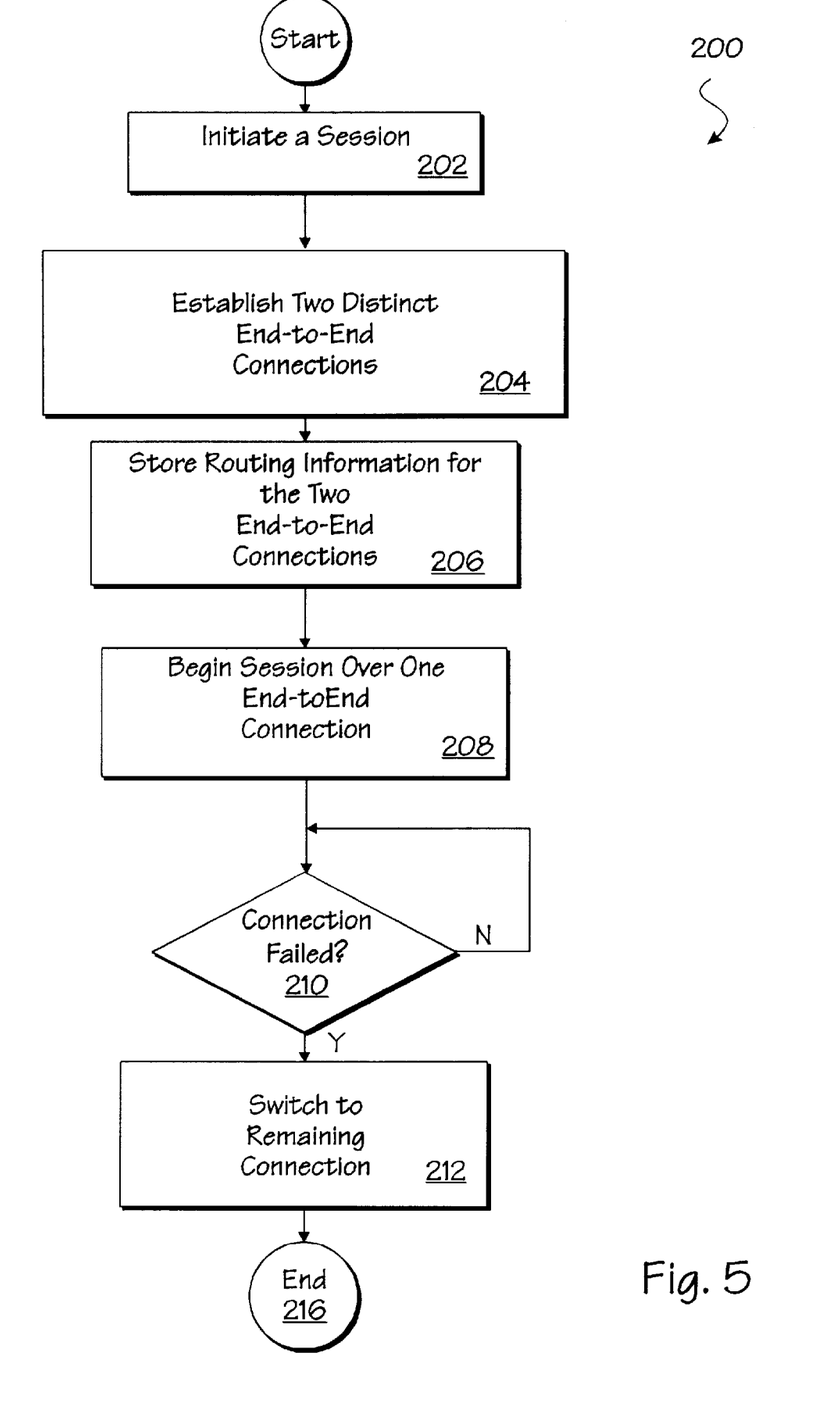
FIG. 5 is a flow diagram illustrating a fast failover process in accordance with the present invention.

FIG. 5 further illustrates the rapid failover process. Failover process 200 begins at step 202 when a user initiates a session. Typically, before the session can begin, an end-to-end connection though an ATM network, such as network 100, must be established. In order to establish the end-to-end connection, the L2/L3 addresses of the user's station must be mapped to an appropriate ATM address. In addition, connection information which will allow the user's ATM address to be connected to the destination node's ATM address must be established. As discussed above, this is done using PNNI.

In step 204, PNNI is used by edge switch router 102 to establish two distinct end-to-end connections between the source node and the destination node. In one embodiment, the two distinct end-to-end connections do not share any intermediate nodes or any point-to-point links. This will provide complete redundancy between the two distinct end-to-end connections. However, those skilled in the art will appreciate that due to network resource limitations and other constraints, such a completely redundant system may not always be feasible. In such cases, it may be required that each of the distinct end-to-end connections share an intermediate node and/or one or more intermediate links. It will be appreciated that if such a configuration is adopted and the shared node or link is the point of failure, no rapid failover as described above would be possible. Nevertheless, in some situations the risk of such a failure at a shared node or link may be acceptable or necessary.

At step 206, the routing information for the two end-to-end connections which were established using PNNI are stored in connection tables in the source node.

At step 208, the user session begins using one of the end-to-end connections. The connection is monitored at step 210 to determine if failure has occurred. If a failure does occur, process 200 moves to step 212 where the source node is notified of the failure and automatically remaps the session to the second end-to-end connection which was established at step 204. In this way, very fast failover is achieved. The failed connection may be torn down as required. The user's session is allowed to complete over the second end-to-end connection and, when the session is over, the second connection is torn down and process 200 quits at step 216.

Thus, a mechanism to achieve very fast failover in an ATM network has been described. Although the present invention has been described with reference to specific exemplary embodiments thereof, it will be appreciated that the present invention can be practiced without many of the specific details described herein. Accordingly, the invention should be measured only in terms of the claims which follow.

What is claimed is:

1. A method comprising:

recognizing a first node coupled to a backbone of a data communications network and in response to an update message transmitted according to a private network-to-network interface (PNNI) protocol within the network, that a first end-to-end connection between the first node and a second node coupled to the backbone of the data communications network has failed; and continuing communications between the first node and the second node via a second end-to-end connection established at approximately the same time as the first end-to-end connection and prior to the failure of the first end-to-end connection.

2. The method of claim 1 wherein the first node is an edge switch.

3. The method of claim 1 wherein the first end-to-end connection and the second end-to-end connection are established such that at least some of a plurality of links between nodes of the communications network which comprises the first end-to-end connection are distinct from at least some of a plurality of links between nodes of the communications network which comprise the second end-to-end connection.

4. The method of claim 3 wherein the first end-to-end connection and the second end-to-end connection are established such that all of the links between nodes of the communications network which comprises the first end-to-end connection are distinct from all of the links between nodes of the communications network which comprise the second end-to-end connection.

5. The method of claim 1 wherein both the first end-to-end connection and the second end-to-end connection are utilized for communication between the first node and the second node prior to the failure of the first end-to-end connection.

6. The method of claim 1 further comprising updating a connection table maintained at the first node to reflect the failure of the first end-to-end connection.

7. The method of claim 6 further comprising tearing down the first end-to-end connection.

8. The method of claim 1 wherein continuing communications between the first node and the second node comprises remapping any communications which were taking place over the first end-to-end connection prior to the failure thereof to the second end-to-end connection.

9. The method of claim 8 further comprising tearing down the second end-to-end connection upon completion of the communications between the first node and the second node.

10. A data communication network, comprising:

an edge node; and a plurality of network nodes interconnected via a plurality of communication links to form a backbone; and a second node communicatively coupled to the edge node via a first end-to-end connection and a second end-to-end connection, each of the connections being routed through the backbone and established at approximately the same time, wherein at least one of a plurality of links between the nodes of the backbone that partially form the first end-to-end connection are distinct from at least one of a plurality of links between the nodes of the backbone that partially form the second end-to-end connection, the edge node configured to recognize the failure of the first end-to-end connection in response to an update message transmitted according to a private network-to-network interface (PNNI) and to automatically switch any communications with the edge node to the first end-to-end connection.

11. The data communication network of claim 10 wherein the first end-to-end connection and the second end-to-end connection are established prior to the failure of the second end-to-end connection.

12. Implemented within a backbone of a data communications network, a router comprising:

first means for establishing a first end-to-end connection and a second end-to-end connection with a node using a private network-to-network protocol, the first end-to-end connection and the second end-to-end connection are established at approximately the same time;

second means for maintaining communications with the node by automatically switching from the first end-to-end connection and the second end-to-end connection upon failure of the first end-to-end connection.

13. The router of claim 12, wherein the first end-to-end connection includes a plurality of links between intermediate nodes of the data commniucations network.

14. The router of claim 13, wherein the first means establishes the second end-to-end connection using at least one of the plurality of links between the intermediate nodes of the data communications network.

15. The router of claim 13, wherein the first means establishes the second end-to-and connection using at least one link distinct from the plurality of links associated with the first end-to-end connection.

16. The router of claim 12, wherein the first means establishes the second end-to-end connection after establishing the first end-to-end connection.

17. The router of claim 12, wherein the second means includes a connection table to indicate the failure of the first end-to-end connection.

18. A program embodied in a medium readable by an edge switch of a backbone of a data communications network, the program comprising:

code to establish the first end-to-end connections and the second end-to-end connection approximately at the same time;

code to determine that a first end-to-end connection between the edge switch and a node coupled to the backbone of the data communications network has failed; and code to switch from the first end-to-end connection to a second end-to-end connection upon failure of the first end-to-end connection so that the edge switch maintains communications with the node.

19. The program of claim 18, wherein the first end-to-end connection includes a plurality of links between intermediate nodes of the data communications network.

20. The router of claim 12, wherein the first means establishes the second end-to-end connection using at least one of the plurality of links between the intermediate nodes of the data communications network.

21. The router of claim 12, wherein the first means establishes the second end-to-end connection using at least one link distinct from the plurality of limits associated with the first end-to-end connection.

22. The router claim 12, wherein the first means establishes the second end-to-end connection after establishing the first end-to-end connection.

23. The router of claim 12, wherein the second means includes a connection table to indicate the failure of the first end-to-end connection.

* * * * *